United States Patent
Jayaraman et al.

(10) Patent No.: US 9,582,408 B1
(45) Date of Patent: Feb. 28, 2017

(54) SYSTEM AND METHOD FOR OPTIMIZING TESTING OF SOFTWARE PRODUCTION INCIDENTS

(71) Applicant: Wipro Limited, Bangalore (IN)

(72) Inventors: Venkata Subramanian Jayaraman, Chennai (IN); Rajiv Kumar Agrawal, Bangalore (IN); Ganesh Narayan, Bangalore (IN); Bharath Kumar Hemachandran, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 14/929,961

(22) Filed: Nov. 2, 2015

(30) Foreign Application Priority Data

Sep. 3, 2015 (IN) .......................... 4673/CHE/2015

(51) Int. Cl.
G06F 9/44 (2006.01)
G06F 11/36 (2006.01)
G06F 17/30 (2006.01)
G06N 99/00 (2010.01)

(52) U.S. Cl.
CPC ...... *G06F 11/3688* (2013.01); *G06F 11/3664* (2013.01); *G06F 11/3684* (2013.01); *G06F 17/30598* (2013.01); *G06N 99/005* (2013.01)

(58) Field of Classification Search
CPC ........................................ G06F 11/36–11/3696
USPC ...................................... 717/124–127; 714/26
See application file for complete search history.

(56) References Cited

U.S. PATENT DOCUMENTS

| | | | | |
|---|---|---|---|---|
| 6,502,102 B1 * | 12/2002 | Haswell | .............. | G06F 11/3664 |
| 6,701,514 B1 * | 3/2004 | Haswell | .............. | G06F 11/3664 |
| | | | | 707/999.102 |
| 6,907,546 B1 * | 6/2005 | Haswell | .............. | G06F 11/3684 |
| | | | | 714/38.11 |
| 7,020,697 B1 * | 3/2006 | Goodman | .............. | G06Q 10/10 |
| | | | | 709/223 |

(Continued)

OTHER PUBLICATIONS

Test Case Prioritization for Audit Testing of Evolving Web Services using Information Retrieval Techniques—Cu D. Nguyen, Alessandro Marchetto, Paolo Tonella—Software Engineering Research Unit, Fondazione Bruno Kessler Trento, Italy—2011 IEEE International Conference on Web Services—2011 IEEE.*

(Continued)

*Primary Examiner* — Francisco Aponte
(74) *Attorney, Agent, or Firm* — Finnegan, Henderson, Farabow, Garrett & Dunner LLP (57) ABSTRACT

This disclosure relates generally to software testing, and more particularly to a system and method for optimizing testing of software production incidents. In one embodiment, the method comprises analyzing an incident ticket using a machine learning algorithm to identify one or more keywords in the incident ticket, and identifying a location of the incident ticket based on the one or more keywords, a test workspace corresponding to the incident ticket based on the location, and a plurality of specific test cases corresponding to the incident ticket based on the test workspace. The identification leads to a first scenario and a second scenario. In the first scenario, the method further comprises initiating a learning process based on intelligence gathered from a manual processing of the incident ticket. In the second scenario, the method further comprises executing the plurality of specific test cases in a test environment.

16 Claims, 4 Drawing Sheets

(56) References Cited

U.S. PATENT DOCUMENTS

| | | | |
|---|---|---|---|
| 7,167,870 B2 | 1/2007 | Avvari et al. | |
| 7,225,139 B1* | 5/2007 | Tidwell | G06Q 10/063114 705/7.15 |
| 7,403,901 B1* | 7/2008 | Carley | G06F 17/30306 379/111 |
| 7,409,592 B2* | 8/2008 | Decker | G06F 11/3676 714/25 |
| 7,437,614 B2* | 10/2008 | Haswell | G06F 11/3684 714/38.13 |
| 7,467,198 B2* | 12/2008 | Goodman | G06Q 10/06 709/223 |
| 7,516,438 B1* | 4/2009 | Leonard | G06Q 10/10 706/13 |
| 7,730,005 B2* | 6/2010 | Gilliam | G06N 99/005 706/45 |
| 7,890,802 B2* | 2/2011 | Gerber | G06F 11/0709 714/25 |
| 7,934,127 B2* | 4/2011 | Kelso | G06F 11/3688 714/38.1 |
| 8,151,276 B2* | 4/2012 | Grechanik | G06F 8/38 717/115 |
| 8,205,191 B1 | 6/2012 | Kolawa et al. | |
| 8,276,123 B1 | 9/2012 | Deng et al. | |
| 8,347,147 B2* | 1/2013 | Adiyapatham | G06F 11/3672 714/38.1 |
| 8,458,662 B2* | 6/2013 | Grechanik | G06F 11/368 715/762 |
| 8,473,916 B2 | 6/2013 | Venkatraman et al. | |
| 8,539,282 B1* | 9/2013 | Kabanov | G06F 11/3688 702/182 |
| 8,660,952 B1* | 2/2014 | Viera | G06Q 20/042 705/1.1 |
| 8,694,966 B2 | 4/2014 | Gupta | |
| 8,832,047 B2* | 9/2014 | Herbach | H04L 67/42 707/694 |
| 9,002,763 B2* | 4/2015 | Gupta | G06F 17/30643 706/20 |
| 9,009,665 B2* | 4/2015 | Supplisson | G06F 11/362 717/121 |
| 9,038,026 B2* | 5/2015 | Chandra | G06F 11/3684 717/124 |
| 9,135,146 B1* | 9/2015 | Allen | G06F 11/366 |
| 9,299,031 B2* | 3/2016 | Jan | G06N 5/048 |
| 9,373,090 B2* | 6/2016 | Gupta | G06F 17/30643 |
| 9,430,359 B1* | 8/2016 | Troutman | G06F 11/366 |
| 9,535,818 * | 1/2017 | Vasudevan | G06F 11/3664 |
| 2005/0081079 A1* | 4/2005 | Cheston | G06F 11/2294 714/2 |
| 2006/0206867 A1* | 9/2006 | Parsons | G06F 11/3664 717/124 |
| 2008/0126880 A1 | 5/2008 | Hegarty et al. | |
| 2012/0254333 A1* | 10/2012 | Chandramouli | G06F 17/27 709/206 |
| 2013/0074038 A1* | 3/2013 | Fox | G06F 8/70 717/122 |
| 2013/0074043 A1* | 3/2013 | Fu | G06F 11/3684 717/125 |
| 2013/0097586 A1* | 4/2013 | Chandra | G06F 11/3684 717/124 |
| 2013/0179736 A1* | 7/2013 | Gschwind | G06F 11/3075 714/37 |
| 2013/0311968 A1* | 11/2013 | Sharma | G06Q 10/06 717/101 |
| 2013/0339930 A1* | 12/2013 | Xu | G06F 11/3684 717/125 |
| 2014/0109053 A1* | 4/2014 | Vasudevan | G06F 11/3692 717/124 |
| 2014/0129536 A1* | 5/2014 | Anand | G06Q 10/0635 707/706 |
| 2014/0173737 A1* | 6/2014 | Toback | G06F 21/57 726/25 |
| 2014/0316997 A1* | 10/2014 | Van Buskirk | G06Q 30/016 705/304 |
| 2015/0007138 A1 | 1/2015 | Sabetta | |
| 2015/0007148 A1 | 1/2015 | Bartley et al. | |
| 2015/0026664 A1 | 1/2015 | Bartley et al. | |
| 2015/0082287 A1 | 3/2015 | Augustine et al. | |

OTHER PUBLICATIONS

Generation and Optimization of Test cases for Object-Oriented Software Using State Chart Diagram-Ranjita Kumari Swain, 1Rourkela Institute of Mgt. Studies, Rourkela—Prafulla Kumar Behera,Dept. of Comp. Sc., Utkal University, Bhubaneswar—Durga Prasad Mohapatra,Dept. of Comp. Sc. and Engg., National Institute of Technology, Rourkela—2012.*

N. Kaushik et al., "Reconstructing traceability between bugs and test cases: an experimental study", 2011 18th Working Conference on Reverse Engineering, IEEE, pp. 411-414 (2011).

Extended European Search Report from the European Patent Office for counterpart European Application No. EP 15 20 2615 mailed Feb. 12, 2016.

* cited by examiner

SYSTEM AND METHOD FOR OPTIMIZING TESTING OF SOFTWARE PRODUCTION INCIDENTS

TECHNICAL FIELD

This disclosure relates generally to software testing, and more particularly to a system and method for optimizing testing of software production incidents.

BACKGROUND

In the current business environment, need for quality assurance of a software product is paramount to the success of Information Technology (IT) organizations. Quality assurance primarily involves testing of a software product at various stages of the software lifecycle to minimize defects. However, testing is a major factor driving overall cost of the project/program and anything done to reduce the cost of testing directly or indirectly results in cost saving to the project/program. In this context, automation in the area of software testing has grown and a lot of automation techniques are now available to increase efficiency and reduce cost. For example, these techniques include test cases automation to reduce cycle time, process automation to reduce overall schedule, automation of test cases when the requirements are being developed, parallel execution along with development when coding is being done, adding services that control the updating of test cases on change, change management and their impacts on testing and tools to fix them, and so forth. All these techniques involve reducing the time taken to overall testing, thereby reducing cost.

Additionally, the overall quality of any software product is determined based on the total production or post release defects that have leaked into the product. It is preferable to identify and correct defects as soon as possible in a software production so as not to adversely impact the customer experience or the organization's reputation and competitiveness. However, if the total number of production defects is very high, the time taken and cost involved for re-rollout of a product release or for fixing and testing the defects in the release is a challenge as testing imposes a big bottleneck. The main reason for above is time and cost incurred to manually identify right test cases to verify the fix, to manually execute the identified test cases for the given fix, and to manually identify regression test suite to make sure that the fix has not broken any other major functionalities.

A cost analysis shows that when a defect is leaked into production the cost of fixing that defect and testing the solution is the costliest. For example, if a defect that could have been detected in requirement phase is detected post release, then it would cost about 10-100 times more to fix than if the defect had been detected in the requirement phase itself. Further, if a defect is leaked to release after construction, then it would be 25 times costly to fix it. As stated above, this is mostly because of the retesting effort that is needed.

Existing software testing techniques do not completely address the issues stated above particularly with respect to production or post release defects. Existing techniques to test the production defects and/or to arrest production defects in customer environment involve manual processing and operations and are therefore time consuming and cost intensive. Moreover, there is no automated way to connect the various systems so as to optimize fixing and testing of software production defects. All these results in increased business spend for a particular release.

SUMMARY

In one embodiment, a method for optimizing testing of software production incidents is disclosed. In one example, the method comprises categorizing an incident ticket received from one or more sources based on one or more pre-defined parameters. The incident ticket corresponds to an obstruction in a software production. The method further comprises analyzing the incident ticket using a machine learning algorithm to identify one or more keywords in the incident ticket in response to categorization. The method further comprises identifying a location of the incident ticket based on the one or more keywords, a test workspace corresponding to the incident ticket based on the location, and a plurality of specific test cases corresponding to the incident ticket based on the test workspace. The identification leads to a first scenario and a second scenario. In the first scenario, the method further comprises initiating a learning process based on intelligence gathered from a manual processing of the incident ticket. In the second scenario, the method further comprises identifying a test environment for the plurality of specific test cases, and executing the plurality of specific test cases in the test environment.

In one embodiment, a system for optimizing testing of software production incidents is disclosed. In one example, the system comprises at least one processor and a memory communicatively coupled to the at least one processor. The memory stores processor-executable instructions, which, on execution, cause the processor to categorize an incident ticket received from one or more sources based on one or more pre-defined parameters. The incident ticket corresponds to an obstruction in a software production. The processor-executable instructions, on execution, further cause the processor to analyze the incident ticket using a machine learning algorithm to identify one or more keywords in the incident ticket in response to categorization. The processor-executable instructions, on execution, further cause the processor to identify a location of the incident ticket based on the one or more keywords, a test workspace corresponding to the incident ticket based on the location, and a plurality of specific test cases corresponding to the incident ticket based on the test workspace. The identification leads to a first scenario and a second scenario. In the first scenario, the processor-executable instructions, on execution, further cause the processor to initiate a learning process based on intelligence gathered from a manual processing of the incident ticket. In the second scenario, the processor-executable instructions, on execution, further cause the processor to identify a test environment for the plurality of specific test cases, and to execute the plurality of specific test cases in the test environment.

In one embodiment, a non-transitory computer-readable medium storing computer-executable instructions for optimizing testing of software production incidents is disclosed. In one example, the stored instructions, when executed by a processor, cause the processor to categorize an incident ticket received from one or more sources based on one or more pre-defined parameters. The incident ticket corresponds to an obstruction in a software production. The stored instructions, when executed by a processor, further cause the processor to analyze the incident ticket using a machine learning algorithm to identify one or more keywords in the incident ticket in response to categorization. The stored instructions, when executed by a processor, further cause the processor to identify a location of the incident ticket based on the one or more keywords, a test workspace corresponding to the incident ticket based on the location, and a plurality of specific test cases corresponding to the incident ticket based on the test workspace. The identification leads to a first scenario and a second scenario. In the first scenario, the stored instructions, when executed by a processor, further cause the processor to initiate a learning process based on intelligence gathered from a manual processing of the incident ticket. In the second scenario, the stored instructions, when executed by a processor, further cause the processor to identify a test environment for the plurality of specific test cases, and to execute the plurality of specific test cases in the test environment.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
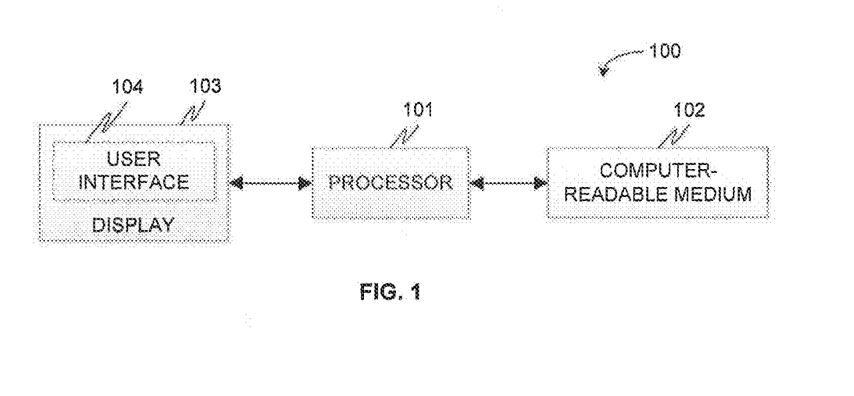
FIG. 1 is a block diagram of an exemplary system for optimizing testing of software production incidents in accordance with some embodiments of the present disclosure.

Referring now to FIG. 1, an exemplary system 100 for optimizing testing of software production incidents is illustrated in accordance with some embodiments of the present disclosure. In particular, the system 100 implements an incident management engine for providing optimized testing of incidents corresponding to defects or obstructions in a software production. As will be described in greater detail in conjunction with FIG. 2, the the incident management engine interacts with multiple users (e.g., quality assurance team, development team, business analyst team, and so forth) and multiple software development, testing, and management systems or platforms (e.g., test management systems, test environment systems, and so forth), identifies a test workspace by analyzing an incident ticket, determines required test cases for the incident ticket in the test workspace, and executes the required test cases in a requisite test environment. The system 100 comprises one or more processors 101, a computer-readable medium (e.g., a memory) 102, and a display 103. The computer-readable medium 102 stores instructions that, when executed by the one or more processors 101, cause the one or more processors 101 to perform optimized testing of software production incidents in accordance with aspects of the present disclosure. The system 100 interacts with users via a user interface 104 accessible to the users via the display 103.

Figure 2:
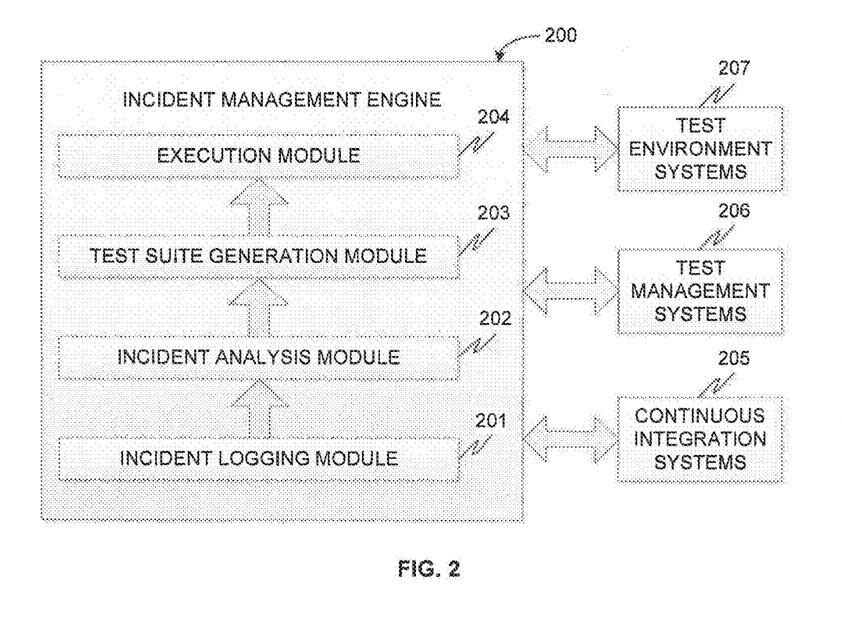
FIG. 2 is a functional block diagram of an incident management engine in accordance with some embodiments of the present disclosure.

Referring now to FIG. 2, a functional block diagram of an incident management engine 200 implemented by the system 100 of FIG. 1 is illustrated in accordance with some embodiments of the present disclosure. In some embodiments, the incident management engine 200 comprises an incident logging module 201, an incident analysis module 202, a test suite generation module 203, and an execution module 204. A user may interact with the incident management engine 200 from the web browser or other interfaces. The incident management engine 200 may further interact with one or more continuous integration systems 205, one or more test management systems 206, and one or more test environment systems 207.

The incident logging module 201 receives and logs all the incidents either via a manual or an automated process whenever there is a production failure that has been encountered in any of the software product. Incidents may be raised by customer on phone, via Fax, or via email. An incident ticket is automatically generated and logged in an incident repository by the incident logging module 201 whenever an incident is reported. The incident ticket captures the information from a customer site. It should be noted that incident typically provide only cursory information that may be captured.

The incident analysis module 202 analyzes the incident tickets so as to determine the categories of the incident tickets and to identify a test workspace. For example, in some embodiments, the incident tickets may be categorized based on departments they belong to. Once categorized, the incident tickets are sorted. Incident tickets that only require a L1 support (e.g., telephone helpdesk, customer center support, and so forth) are moved out from here directly. The remaining incident tickets are analyzed against the main areas/locations which are identified for the first time with the involvement of the business analysts, quality analysts, and application development team. The teams provide the priority and severity of each area. The severity and priority of the area are the average of the all the teams. The business holds the final veto to either accept or overwrite the whole value provided by different teams. In some embodiments, the priority and severity rating is done in three levels for which the threshold values may be a configurable value. By way of example, the incident logging module 201 may have default threshold values for each rating which may be updated by a user. For example, in certain embodiments, sample illustration of the rating threshold values is shown in Table A below while sample illustration of the area/location priority values provided by different teams is shown in Table B:

TABLE A

| Rating | Threshold Value |
|---|---|
| High | 1 |
| Medium | 2 |
| Low | 3 |

TABLE B

| Area/Location | BA Team | QA Team | Development Team | Average | Business Team |
|---|---|---|---|---|---|
| Pharmacy queue | 3 | 1 | 1 | 1.67 | 1 |
| Stores | 2 | 3 | 3 | 2.67 | 2 |
| Web store | 3 | 3 | 3 | 3 | 3 |
| Billing | 3 | 3 | 3 | 3 | 1 |

The test suite generation module 203 identifies the right test cases needed for execution based on the analytical result. The right test cases are identified based on their suitability for a given incident ticket belonging to an identified test workspace. Further, the execution module 204 executes the identified test cases in a right test environment. The test environment may be tools, batch jobs, or locations where test cases may be executed either manually or automatically. The incident management engine 200 may integrate with the various systems to ensure that the right environment is provided to the right test cases so that the result could be appropriate. The contiguous integration systems 205 enable the incident management engine 200 to select an appropriate or a requisite environment that may be required for a specific test case.

Additionally, the incident management engine 200 may interact with the test management systems 206 that store and manage various test cases, defects, fixes results of execution of test cases, and so forth. The test management systems 206 may include one or more repositories for storing various data. For example, it may include a test cases repository to store various test cases, a test workspace repository to store various test workspaces, and a location repository to store various locations to which incident tickets may belong to. In some embodiments, the test management systems 206 may be an application lifecycle management (ALM) platform such as IBM™ Rational® Jazz™ platform, Microsoft™ Team Foundation Server (TFS), HP® ALM, and so forth. Alternatively, the test management systems 206 may be any test management tool such as JIRA™ that may be employed for testing or project management of the software product. Further, the incident management engine 200 may interact with the test environment systems 207 that provide for the location from where the test cases are operated. The execution module 204 connects with the test environment systems 207 to access the right environment to run the test cases.

In some embodiments, the incident management engine 200 provides for optimized testing of software production incidents by performing following primary functions: (i) identification of test workspaces by analyzing the production incidents/defect data logged using keyword search analytics, (ii) determination of the required test cases by analyzing the existing test cases in identified work spaces using keyword search analytics, and (iii) execution of the identified test cases in the requisite test environments and generating analysis reports. Each of these functions will be described in greater detail below.

The incident logging module 201 receives details of the product incidents or the defect data from one or more sources (e.g., such as incident reported by user on phone, via Fax, or via email). An incident ticket is created and logged in an incident repository corresponding to the incident is reported. The incident tickets so created are then classified based on one or more predefined parameters such as who logged the incident, what system is the incident belonging to, and which location did the incident come from. Thus, in some embodiments, the tickets are categorized based on the person, system and location. For example, in certain embodiments, sample illustration of categorized incident tickets is provided in following table:

TABLE C

| Incident No. | Person | System | Country | Country_Area | Incident Description |
|---|---|---|---|---|---|
| 1 | XXXXX | Pharma | USA | Pharma_USA | Pharmacy application not launching |
| 2 | YYYYY | Pharma | INDIA | Pharma_INDIA | Optical system does not allow payments |
| 3 | ZZZZZ | Ecom | UK | Ecom_UK | XXX home page is not opening |

The categorized tickets are then analyzed based on the keywords in the incident description to separate out the L1 tickets. In some embodiments, the condition that needs to be satisfied for L1 incident ticket may be that the time taken to fix the issues is less than 10 hours and the fix is purely hardware related. The identified L1 incidents are separated out and given to the incident management team for manual fixing. The remaining categorized incident details are then provided to the incident analysis module 202 where the incident description provided with the incident is retrieved and analyzed. The incident description is analyzed using the artificial intelligence technique for identifying the different keywords in the incident description text. The artificial intelligence technique may include any machine learning algorithms such as case-based reasoning, decision tree learning, association rule learning, cluster analysis, rule-based learning, artificial neural networks, Bayesian networks, genetic algorithms, fuzzy logic, inductive logic, multi-agent models, reinforcement learning, hybrid learning, and so forth. It should be noted that the keywords are specific details provided in the incident description text by the customer or the operational support team who perform the incident reporting. The keywords is then used for keyword-location mapping, i.e., mapping the incident tickets to the respective area/location to which the ticket has to be routed based on the priority and severity of that keyword and location. It should be noted that the priority and severity is not only based on incident ticket but also based on its impact on business. For example, in some embodiments, a sample illustration of the different locations' priority and severity rating is provided in following table:

TABLE D

| Location | Priority | Severity |
|---|---|---|
| Pharma Queue | 1 | 1 |
| Stores | 2 | 2 |
| Web Store | 3 | 3 |

The incident description is compared using the artificial intelligence technique with the location details available in incident analysis module 202 such as those listed in Table D.

It is compared to see if any of the identified keywords in the incident description matches with the location names. If the identified keywords matches then the location of where the incident ticket has to go, severity and priority are taken in from the keyword-location mapping information available. It should be noted that the initial keyword of the mapping is based on the inputs provided in the incident management engine 200 and the information that is read by the machine learning algorithms. As will be appreciated, the keyword-location mapping gets updated from time to time based on the learning by the machine learning algorithms. For example, in some embodiments, a sample illustration of the keyword-location mapping is provided in following table:

TABLE E

| Keywords | Location | Priority | Severity |
|---|---|---|---|
| Pharma, Health | Pharma Queue | 1 | 1 |
| Associate, Incentive, Plan | Stores | 2 | 2 |
| Ecom, Homepage | Web Store | 3 | 3 |

If the identified keywords do not match then the incident analysis module 202 returns the notification information to the user stating no match could be found. The user may then be provided with the option to enter the new location, severity, priority into the system configuration mapping details. If the user selects an existing location, then the incident analysis module 202 takes keyword as inputs and updates the keyword-location mapping details with the corresponding keywords using the machine learning techniques automatically. As will be appreciated, with time and usage the module keeps learning and the keyword-location mapping is updated with more and more keywords which may be used to assign future incident tickets.

Thus, in short, the incident analysis module 202 reads text from the incident description, searches for keywords of the text from the keyword-location mapping, and provides location, priority, and severity if the text matches with those in mapping. However, if the text does not match with those in mapping, the incident analysis module 202 returns notification to the user, provides option to enter the new location, and modifies the mapping details with new location and keywords.

The identified location/area details using the keywords are then provided to the test management system 206 to identify the test workspaces corresponding to the location/area. The incident tickets corresponding with the specific location are added to the test management system. The mapping of the location and the work spaces are maintained in the incident analysis module 202. It should be noted that the mapping is setup using manual mechanism for the first time. However, as new workspaces are created in the test management system 205, the incident management engine is fed with data of which location the workspace is going to handle. The location-workspace mapping is updated based on this information. Further, it should be noted that as the mapping data does not change frequently, this data is typically kept constant. For example, in some embodiments, a sample illustration of mapping of the location to different workspaces identified is provided in following table:

TABLE F

| Location | Workspace |
|---|---|
| Pharma Queue | WS1, WS2 |
| Stores | WS4, WS3 |

The details of identified test workspaces are then used by the incident analysis module 202 and the test management system 206 to identify the required or specific test cases for the incident tickets. In some embodiments, all the test cases identified may be further refined using a two level keyword search analytics implemented using artificial intelligence technique. For example, for each of the location-workspace mapping the initial search keywords may be updated based on the expertise of the quality assurance (QA) team for the initial setup. QA provides the search keywords based on the earlier experience and builds the initial mapping. QA team may provide their inputs in to the remedy/incident mapping system. These keywords are the initial keywords that facilitate the location-workspace-keyword mapping or the search keyword mapping. For example, in some embodiments, a sample illustration of the initial search keyword mapping provided by QA team is shown in following table:

TABLE G

| Location | Workspace | Initial Search Keywords |
|---|---|---|
| Pharma Queue | WS1, WS2 | Pricing, Cost |
| Stores | WS4, WS3 | Costing, Financials |

After the initial setup, the search keyword mapping is enhanced using self-learning techniques implemented using artificial intelligence technique. The incidents that have been identified earlier may be passed through the defect triage process. As will be appreciated, defect triage process is a process in which project stakeholders go through new or existing defects and decide on the action items. For example, during the triage process the key secondary words may be added to the incident tickets. As the additional keywords are provided, the machine learning algorithm of the artificial intelligence technique learns the keywords and keeps updating them to the existing table automatically. The learning process involves understanding the input supplied by the user via machine learning algorithm, starting the artificial intelligence analytics to learn the keywords, and updating the keywords in the second search keyword mapping based on the entry by the user. Thus, the search keyword mapping gets enhanced with new keywords every time it learns new information. For example, in some embodiments, a sample illustration of the enhanced search keywords mapping is provided in following table:

TABLE H

| Location | Workspace | Enhanced Search Keywords |
|---|---|---|
| Pharma Queue | WS1, WS2 | Pricing, Cost, Optical |
| Stores | WS4, WS3 | Costing, Financials, Workers |

A test case location is then identified from the different test workspaces identified earlier based on the location-workspace mapping and corresponding search keyword mapping. The test case location tells the exact location where the test cases are present. For example, in some embodiments, a sample illustration of the test case location identification is provided in following table:

TABLE I

| Location | Workspace | Enhanced Search Keywords | Test Case Location |
|---|---|---|---|
| Pharma Queue | WS1, WS2 | Pricing, Cost, Optical | WS1 |
| Stores | WS4, WS3 | Costing, Financials, Workers | WS3 |

The test management system 206 provides the identified test case location to the test suite generation module 203. The test suite generation module 203 then identifies the specific test cases from the test case location using the keyword search technique as explained above. In some embodiments, the specific test cases so identified may be optimized using optimization tools or all the specific test cases may be selected based on an option selected by the user. The identified specific test cases are accordingly provided to the test suite generation module 203. Once the test suite generation module 203 is loaded with all the test cases resulting from the search, the tester/user may be prompted for verification. An input from the tester is taken to verify and confirm whether the identified test cases are sufficient to ensure that the test cases are good enough for the validation process. If the test cases are insufficient the user/tester is provided with the option to update/create/delete/modify new tests into the system. The engine 200 would learn the information keyed in and save them to the test management system 206 along with location-workspace mapping from where the test cases were picked up for automatic handling of future incident tickets.

The specific test cases identified in the test suite generation module 203 are provided to the execution module 204 for execution. The execution module 204 establishes connection with the test environment system 207 and identifies the right environment to run the specific test cases. It should be noted that a production like environment is preferable. Typically, the environment used may be a user acceptance testing (UAT) environment or a certification (CERT) environment. These environments are production like environments and ensure that the defect is first reproducible, and then apply the fix or solution, and then test if the fix is working along with the regression around the fix.

The continuous integration system (CIS) 205 facilitates the integration with the various systems to ensure that the right environment is provided to the right test cases so that the result could be appropriate. In some embodiments, the CIS 205 also works on the result based approach. Thus, in case of failure the engine alerts back the development team to inform that a code fix is not working, and if found working ensures that the loop is closed and the production ready code is built and ready for deployment. The CIS 205 gives an option to program a set of pilot stores, that is, if the data is programmed the solution is piloted to the specific store(s).

As will be appreciated, the automatic execution of specific test cases may be considered as an ideal situation. However, in some embodiments, the execution of test cases has to be done manually because of certain constraints in the environment or certain limitations in automating the execution of test cases. The execution module 204 may notify a user if such instances occur. The execution module 204 may further provide a report that shows up the result of execution in a graphical format indicating repeated occurrences of such instances. For example, in some embodiments, the published report may include a graph that indicates to a business user how many test cases are run manually and how many are run automatically and how many are partially run on a quarterly basis. The report therefore provides an insight to the organization and enables business users to infer how effective is the automation, is the automation happening at the right place or not, are there environment failures which hamper the automation, does the area which gets highest ticket need to be automated, what test cases may or should be automated, how the errors are being treated, and so forth. The frequency of such reports may be decided by the team.

Further, in some embodiments, the report may include a return on investment (ROI) analysis graph. It helps in providing to the business a view by ticket of what has happened in each and every incident so that business may ensure that the right incident gets the right attention. Based on the ROI analysis the funding every quarter may be adjusted by the business that could result in better ROI for automation. Additionally, the report may include a comparative analysis of the result which would enable the business user to determine for which solution there was more manual intervention needed and how further learning may be done to improve such manual intervention.

It should be noted that the incident management engine 200 may be implemented in programmable hardware devices such as programmable gate arrays, programmable array logic, programmable logic devices, and so forth. Alternatively, the incident management engine 200 may be implemented in software for execution by various types of processors. An identified engine of executable code may, for instance, comprise one or more physical or logical blocks of computer instructions which may, for instance, be organized as an object, procedure, function, module, or other construct. Nevertheless, the executables of an identified engine need not be physically located together, but may comprise disparate instructions stored in different locations which, when joined logically together, comprise the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for optimizing testing of software production incidents. For example, the exemplary system 100 and the associated incident management engine 200 may optimize testing of software production incidents by the processes discussed herein. In particular, as will be appreciated by those of ordinary skill in the art, control logic and/or automated routines for performing the techniques and steps described herein may be implemented by the system 100 and the associated incident management engine 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
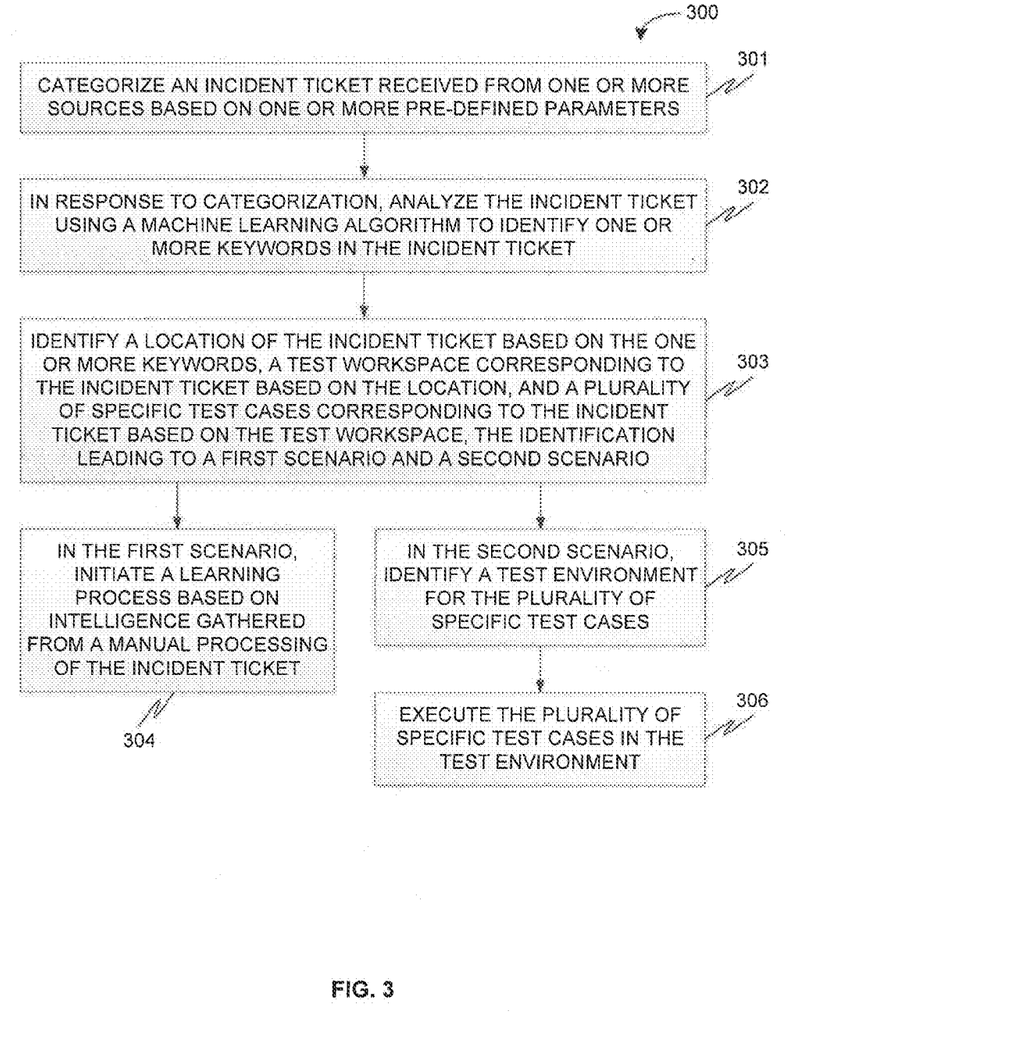
FIG. 3 is a flow diagram of an exemplary process for optimizing testing of software production incidents in accordance with some embodiments of the present disclosure.

For example, referring now to FIG. 3, exemplary control logic 300 for optimizing testing of software production incidents via a system, such as system 100, is depicted via a flowchart in accordance with some embodiments of the present disclosure. As illustrated in the flowchart, the control logic 300 includes the step of categorizing an incident ticket received from one or more sources based on one or more pre-defined parameters at step 301. In response to categorization, the control logic 300 further includes the steps of analyzing the incident ticket using a machine learning algorithm to identify one or more keywords in the incident ticket at step 302, and identifying a location of the incident ticket based on the one or more keywords, a test workspace corresponding to the incident ticket based on the location, and a plurality of specific test cases corresponding to the incident ticket based on the test workspace at step 303. The identification leads to a first scenario and a second scenario. In the first scenario, the control logic 300 further includes the step of initiating a learning process based on intelligence gathered from a manual processing of the incident ticket at step 304. In the second scenario, the control logic 300 further includes the steps of identifying a test environment for the plurality of specific test cases at step 305, and executing the plurality of specific test cases in the test environment at step 306.

As noted above, the incident ticket corresponds to an obstruction (i.e., a defect, or a failure) in a software production. Further, the one or more predefined parameters comprise at least one of a person, a system, and a location related to the incident ticket. In some embodiments, the first scenario corresponds to a negative identification of at least one of the location, the test workspace, and the plurality of specific test cases, while the second scenario corresponds to a positive identification of the location, the test workspace, and the plurality of specific test cases. Further, in some embodiments, the incident ticket resulting in the first scenario comprises a new incident ticket unrelated to a plurality of past incident tickets and not having at least one of a corresponding location, a corresponding test workspace, and a corresponding specific test case. The manual processing of such new incident ticket comprises generating at least one of a solution, a location, a test workspace, a test case, and a test environment.

In some embodiments, the control logic 300 further includes the step of logging the incident ticket in an incident repository. Additionally, in some embodiments, the control logic 300 includes the step of routing the incident ticket to the identified location based on at least one of a priority and a severity rating of the one or more keywords and the identified location. Further, in some embodiments, the control logic 300 includes the step of verifying the plurality of specific test cases for suitability to testing of the incident ticket. In some embodiments, the control logic 300 further includes the step of updating at least one of a location repository, a test workspace repository, a test case repository, a keyword-location mapping, a location-workspace mapping, and a search keyword mapping based on the learning process. Moreover, in some embodiments, the control logic 300 includes the step of generating a report indicating at least one of a result of the execution, a cause leading to failure of the execution, an effectiveness of implementation of the optimized testing, an area with high number of incident tickets that require implementation of the optimized testing, and a return on investment analysis related to implementation of the optimized testing.

In some embodiments, identifying the location of the incident ticket at step 303 comprises referring to a keyword-location mapping. Similarly, in some embodiments, identifying the test workspace corresponding to the incident ticket at step 303 comprises referring to a location-workspace mapping. Additionally, in some embodiments, identifying the plurality of specific test cases at step 303 comprises identifying a test case location from a plurality of test workspaces by referring to a location-workspace mapping and a search keyword mapping, and identifying the plurality of specific test cases from the test case location. In some embodiments, identifying the plurality of specific test cases at step 303 comprises analyzing a plurality of test cases in the test workspace based on the one or more keywords using the machine learning algorithm. Further, in some embodiments, identifying the test environment at step 305 comprises preparing the test environment corresponding to an environment of the software production and based on the plurality of specific test cases.

Figure 4:
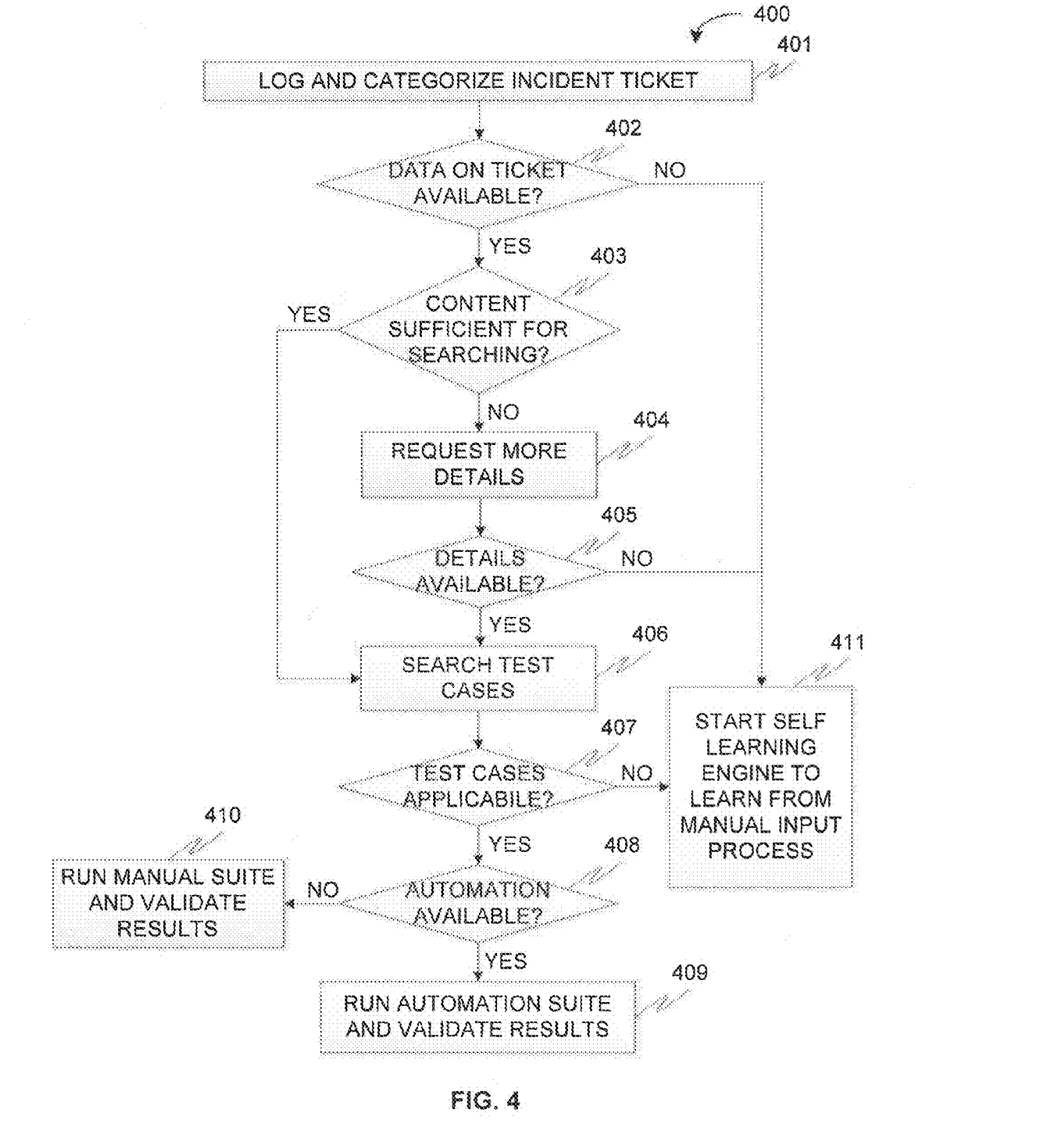
FIG. 4 is a flow diagram of a detailed exemplary process for optimizing testing of software production incidents in accordance with some embodiments of the present disclosure.

Referring now to FIG. 4, exemplary control logic 400 for optimizing testing of software production incidents is depicted in greater detail via a flowchart in accordance with some embodiments of the present disclosure. As illustrated in the flowchart, the control logic 400 includes the step of logging incident tickets and categorizing incident tickets using artificial intelligence technique at step 401. The control logic 400 further includes the step of checking with triage team and determining if data with respect to the incident ticket is available at step 402. The data may include location details corresponding to the incident ticket and test workspace details corresponding to the location details. The step 402 involves referring to the keyword-location mapping and the location-workspace mapping. If the data is available at step 402, the control logic 400 further includes the step of determining if the content of the available data is sufficient for performing a search at step 403. If the content is not sufficient at step 403, the control logic 400 further includes the steps of requesting triage team to provide more details or content with respect to the data at step 404 and checking if more details are available with the triage team at step 405. If the content is sufficient at step 403 or if more details are available at step 405, the control logic 400 includes the steps of searching for required or specific test cases at step 406 and determining their applicability or suitability for testing of the incident tickets at step 407. If the test cases are applicable at step 407, the control logic 400 includes the step of determining if automation is available for the test cases at step 408. If automation is available at step 408, the control logic 400 includes the step of executing automation suite and validating results at step 409. However, if automation is not available at step 408, the control logic 400 includes the step of executing manual suite and validating results at step 410. Moreover, if the data is not available at step 402, or if more details are not available at step 405, or if the test cases are not applicable at step 407, the control logic 400 includes the step of starting self-learning engine to learn from manual input process at step 411.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
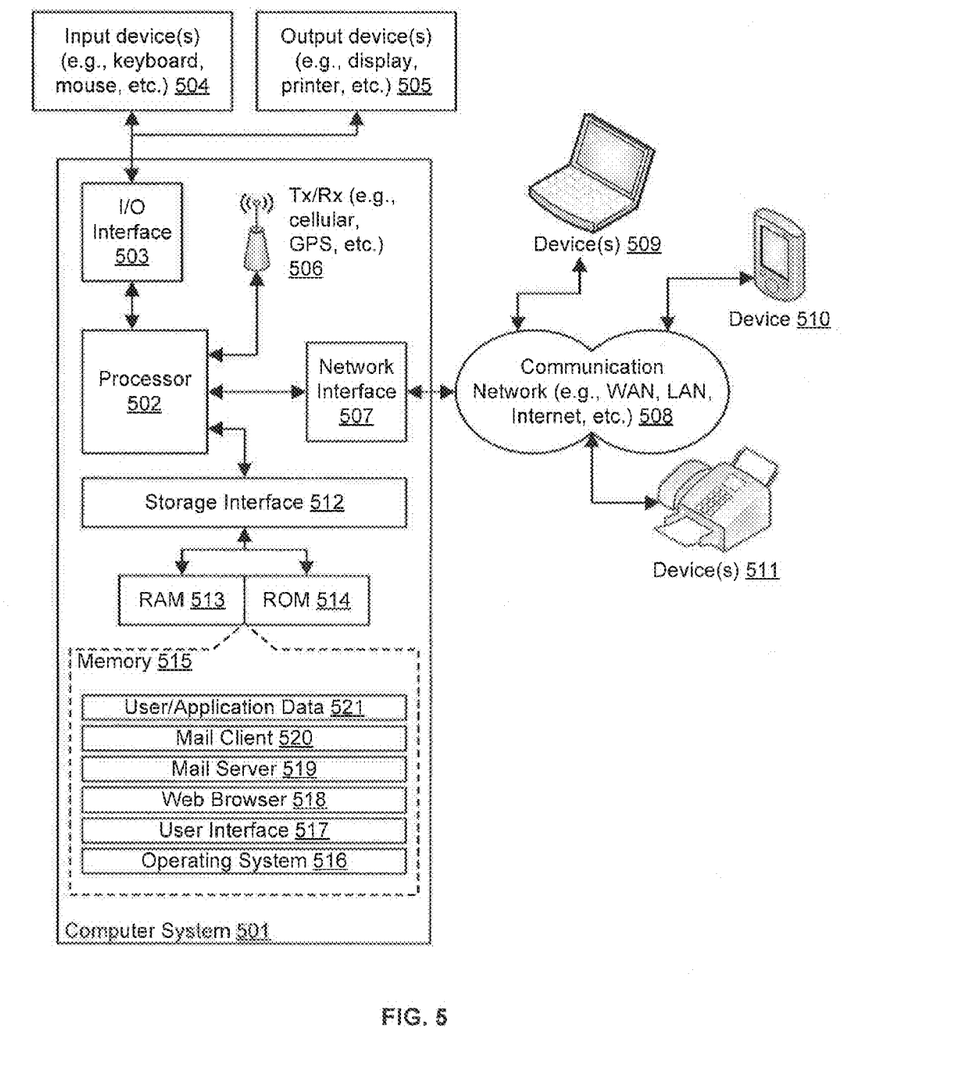
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing system 100 and incident management engine 200 for optimizing testing of the software production incidents. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 413, ROM 414, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., incident tickets, locations/areas, priority and severity ratings, keywords, test workspaces, location-workspace mapping, search keyword mapping, test cases, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above results in efficient, robust, and cost-effective management and testing of software production incidents subsequent to release of a software product. The techniques described in the embodiments discussed above provide an automated process of testing a defect that is found in production, thereby ensuring a consistent and predictive delivery of software product quality. The self-learning mechanism of the process ensures that the process keeps improving its efficiency after putting to use. The feedback mechanism of the process provides feedback to user with respect to benefits and the areas of improvement. The feedback mechanism further receives feedback from users for continuous improvement of the process. Additionally, the techniques described in the embodiments discussed above analyzes the production defects and learns from the pattern, correlates the defects with the existing test cases, and ensures a smooth build, run, and reinstallation into production. Further, the techniques described in the embodiments discussed above is easy to build and use and can be integrated with any system.

The specification has described system and method for optimizing testing of software production incidents. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for optimizing testing of software production incidents, the method comprising:
   categorizing, via a processor, an incident ticket received from one or more sources based on one or more pre-defined parameters, the incident ticket corresponding to an obstruction in a software production;
   in response to categorization, analyzing, via the processor, the incident ticket using a machine learning algorithm to identify one or more keywords in the incident ticket;
   identifying, via the processor, a location of the incident ticket based on the one or more keywords, a test workspace corresponding to the incident ticket based on the location, and a plurality of specific test cases corresponding to the incident ticket based on the test workspace, the identification leading to a first scenario and a second scenario;
   in the first scenario, initiating, via the processor, a learning process based on intelligence gathered from a manual processing of the incident ticket; and
   in the second scenario,
      identifying, via the processor, a test environment for the plurality of specific test cases; and
   executing, via the processor, the plurality of specific test cases in the test environment,
      wherein the first scenario corresponds to a negative identification of at least one of the location, the test workspace, and the plurality of specific test cases,
      wherein the second scenario corresponds to a positive identification of the location, the test workspace, and the plurality of specific test cases,
      wherein the incident ticket resulting in the first scenario comprises a new incident ticket unrelated to a plurality of past incident tickets and not having at least one of a corresponding location, a corresponding test workspace, and a corresponding specific test case, and wherein the manual processing of the new incident ticket comprises generating at least one of a solution, a location, a test workspace, a test case, and a test environment.

2. The method of claim 1, further comprising logging the incident ticket in an incident repository.

3. The method of claim 1, wherein the one or more predefined parameters comprise at least one of a person, a system, and a location related to the incident ticket.

4. The method of claim 1, wherein identifying the location of the incident ticket comprises referring to a keyword-location mapping.

5. The method of claim 1, further comprising routing the incident ticket to the identified location based on at least one of a priority and a severity rating of the one or more keywords and the identified location.

6. The method of claim 1, wherein identifying the test workspace corresponding to the incident ticket comprises referring to a location-workspace mapping.

7. The method of claim 1, wherein identifying the plurality of specific test cases comprises:
identifying a test case location from a plurality of test workspaces by referring to a location-workspace mapping and a search keyword mapping; and
identifying the plurality of specific test cases from the test case location.

8. The method of claim 1, wherein identifying the plurality of specific test cases comprises analyzing a plurality of test cases in the test workspace based on the one or more keywords using the machine learning algorithm.

9. The method of claim 1, further comprising verifying the plurality of specific test cases for suitability to testing of the incident ticket.

10. The method of claim 1, wherein identifying the test environment comprises preparing the test environment corresponding to an environment of the software production and based on the plurality of specific test cases.

11. The method of claim 1, further comprising updating at least one of a location repository, a test workspace repository, a test case repository, a keyword-location mapping, a location-workspace mapping, and a search keyword mapping based on the learning process.

12. The method of claim 1, further comprising generating a report indicating at least one of a result of the execution, a cause leading to failure of the execution, an effectiveness of implementation of the optimized testing, an area with high number of incident tickets that require implementation of the optimized testing, and a return on investment analysis related to implementation of the optimized testing.

13. A system for optimizing testing of software production incidents, the system comprising:
at least one processor; and
a computer-readable medium storing instructions that, when executed by the at least one processor, cause the at least one processor to perform operations comprising:
categorizing an incident ticket received from one or more sources based on one or more pre-defined parameters, the incident ticket corresponding to an obstruction in a software production;
in response to categorization, analyzing the incident ticket using a machine learning algorithm to identify one or more keywords in the incident ticket;
identifying a location of the incident ticket based on the one or more keywords, a test workspace corresponding to the incident ticket based on the location, and a plurality of specific test cases corresponding to the incident ticket based on the test workspace, the identification leading to a first scenario and a second scenario;
in the first scenario, initiating a learning process based on intelligence gathered from a manual processing of the incident ticket; and
in the second scenario, identifying a test environment for the plurality of specific test cases, and executing the plurality of specific test cases in the test environment,
wherein the first scenario corresponds to a negative identification of at least one of the location, the test workspace, and the plurality of specific test cases,
wherein the second scenario corresponds to a positive identification of the location, the test workspace, and the plurality of specific test cases,
wherein the incident ticket resulting in the first scenario comprises a new incident ticket unrelated to a plurality of past incident tickets and not having at least one of a corresponding location, a corresponding test workspace, and a corresponding specific test case, and
wherein the manual processing of the new incident ticket comprises generating at least one of a solution, a location, a test workspace, a test case, and a test environment.

14. The system of claim 13, wherein identifying the location of the incident ticket comprises referring to a keyword-location mapping, and wherein identifying the test workspace corresponding to the incident ticket comprises referring to a location-workspace mapping, and wherein identifying the plurality of specific test cases comprises identifying a test case location from a plurality of test workspaces by referring to a location-workspace mapping and a search keyword mapping and identifying the plurality of specific test cases from the test case location.

15. The system of claim 13, wherein the manual processing of the incident ticket comprises generating at least one of a solution, a location, a test workspace, a test case, and a test environment, and wherein the operations further comprise updating at least one of a location repository, a test workspace repository, a test case repository, a keyword-location mapping, a location-workspace mapping, and a search keyword mapping based on the learning process.

16. A non-transitory computer-readable medium storing computer-executable instructions for:
categorizing an incident ticket received from one or more sources based on one or more pre-defined parameters, the incident ticket corresponding to an obstruction in a software production;
in response to categorization, analyzing the incident ticket using a machine learning algorithm to identify one or more keywords in the incident ticket;
identifying a location of the incident ticket based on the one or more keywords, a test workspace corresponding to the incident ticket based on the location, and a plurality of specific test cases corresponding to the incident ticket based on the test workspace, the identification leading to a first scenario and a second scenario;
in the first scenario, initiating a learning process based on intelligence gathered from a manual processing of the incident ticket; and
in the second scenario, identifying a test environment for the plurality of specific test cases, and executing the plurality of specific test cases in the test environment, wherein the first scenario corresponds to a negative identification of at least one of the location, the test workspace, and the plurality of specific test cases, wherein the second scenario corresponds to a positive identification of the location, the test workspace, and the plurality of specific test cases, wherein the incident ticket resulting in the first scenario comprises a new incident ticket unrelated to a plurality of past incident tickets and not having at least one of a corresponding location, a corresponding test workspace, and a corresponding specific test case, and wherein the manual processing of the new incident ticket comprises generating at least one of a solution, a location, a test workspace, a test case, and a test environment.

* * * * *